United States Patent [19]

Christianson

[11] 4,328,982

[45] May 11, 1982

[54] FLUID FITTING

[75] Inventor: Roger D. Christianson, Los Alamitos, Calif.

[73] Assignee: The Deutsch Company Metal Components Division, Los Angeles, Calif.

[21] Appl. No.: 74,874

[22] Filed: Sep. 12, 1979

Related U.S. Application Data

[63] Continuation-in-part of Ser. No. 955,494, Oct. 27, 1978, abandoned.

[51] Int. Cl.³ .............................................. F16L 17/02
[52] U.S. Cl. .................................... 285/351; 285/369; 285/382.2
[58] Field of Search .................. 285/256, 382, 382.1, 285/382.2, 369, 352, 382.7, 342, 343; 29/516, 450, 421

[56] References Cited

U.S. PATENT DOCUMENTS

| | | | |
|---|---|---|---|
| Re. 28,457 | 7/1975 | Dawson | 285/382.2 |
| 166,735 | 8/1875 | Walworth | 285/382.2 |
| 1,186,813 | 6/1916 | McFerran | 285/382.2 X |
| 1,901,088 | 3/1933 | Dick | 29/508 |
| 2,001,204 | 5/1935 | Long et al. | 285/381 |
| 2,008,227 | 7/1935 | Reilly | 29/517 |
| 2,335,414 | 11/1943 | Hinrichs | 239/283 |
| 2,693,377 | 11/1954 | Wurzburger | 285/343 |
| 2,854,744 | 10/1958 | Crockett | 29/516 |
| 2,926,029 | 2/1960 | St. Clair | 285/256 |
| 3,149,861 | 9/1964 | Larsson | 29/450 |
| 3,474,519 | 10/1969 | Hallesy | 29/432 |
| 3,477,750 | 11/1969 | Powell | 285/382 |
| 3,498,648 | 3/1970 | Hallesy | 285/382.2 |
| 3,579,794 | 5/1971 | Powell | 285/382.2 X |
| 3,596,939 | 8/1971 | Gibson | 285/382.2 |
| 3,652,111 | 3/1972 | Dent | 285/382 |
| 3,675,949 | 7/1972 | Dawson | 285/382.2 |
| 3,893,718 | 7/1975 | Powell | 285/382.2 |
| 4,018,462 | 4/1977 | Saka | 285/382.2 X |
| 4,061,367 | 12/1977 | Moebius | 285/382.2 |

FOREIGN PATENT DOCUMENTS

| | | | |
|---|---|---|---|
| 2097916 | 3/1972 | France | |
| 134042 | 11/1971 | Netherlands | 285/111 |
| 1172497 | 12/1969 | United Kingdom | 285/382.7 |
| 1313242 | 4/1973 | United Kingdom | 285/353 |

*Primary Examiner*—Dave W. Arola
*Attorney, Agent, or Firm*—Gausewitz, Carr, Rothenberg & Edwards

[57] ABSTRACT

This invention provides a fluid fitting for joining two tubular members in a fluid-tight relationship, the fitting including a sleeve having outer end portions with ridge means on the inner surfaces thereof for retaining a tube upon being compressed inwardly around the tube, sealing areas inwardly of the retention areas, the sealing areas including sealing elements on the inner wall of the fitting for forming a fluid-tight engagement with a tubular member received within the fitting upon compression around the tubular member, intermediate areas separating the end portions and the sealing areas, and a central portion of increased wall thickness for providing a greater strength at that area.

26 Claims, 11 Drawing Figures

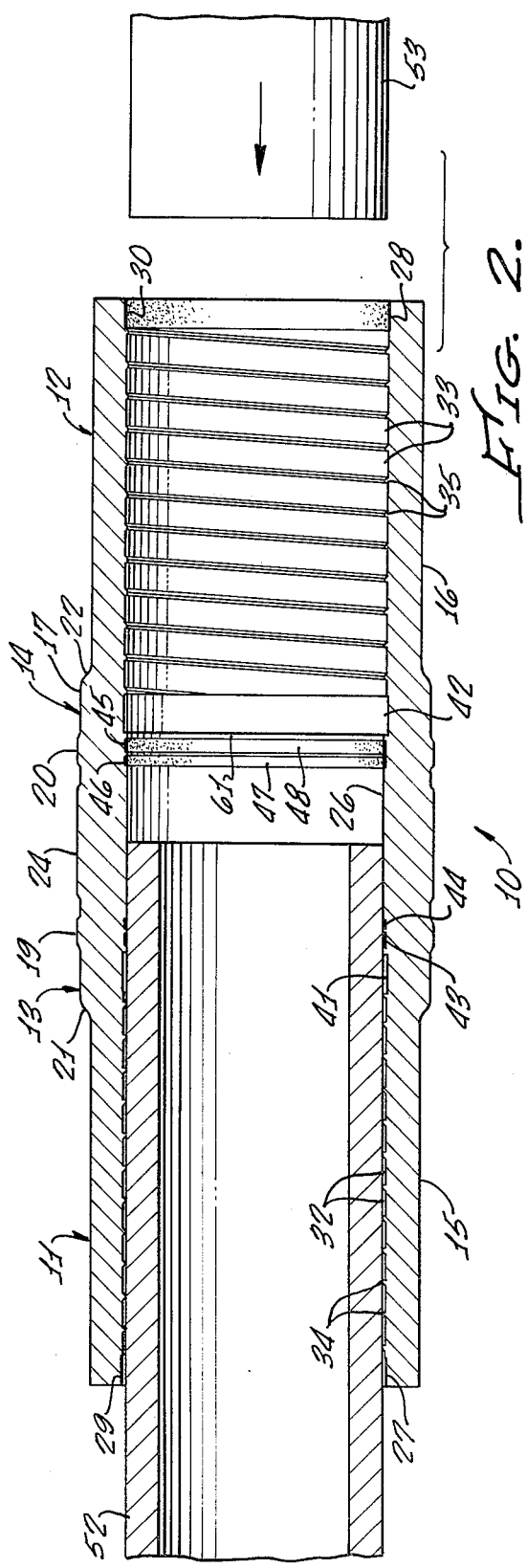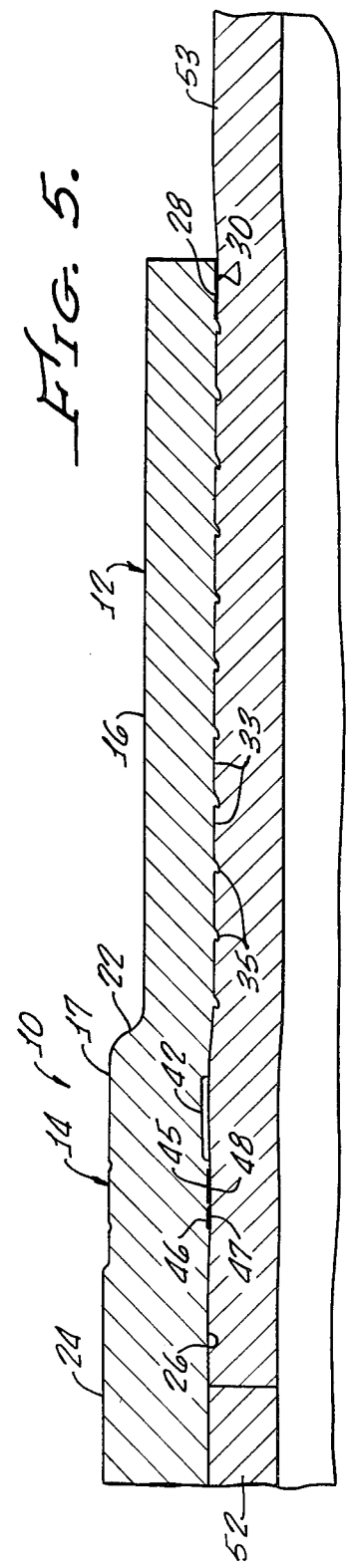

FLUID FITTING

This application is a continuation-in-part of Ser. No. 955,494, filed Oct. 27, 1978, now abandoned.

BACKGROUND OF THE INVENTION

1. Field of the Invention

This invention relates to fluid fittings.

2. Description of the Prior Art

Swaged fittings for joining tubular members together, such as in a hydraulic system or for connecting tubular members to other devices, have been used very successfully because they are reliable, easy to service, such as by making connections in the field, and are relatively low in cost. The integrity of the joint and life of the connection is very favorable compared with other types of fittings for connecting tubular elements.

In one such device, as shown in U.S. Pat. No. Re. 28,457, the fitting includes exterior redges which, upon swaging, are transferred to the inner surface of the fitting. In other words, the inner surface of the fitting initially is of constant diameter except for small sealing grooves, while the exterior surface is provided with ridges. After the swaging operation, the exterior surface is of constant diameter and the ridges are transferred to the inner surface of the fitting to provide a connection with the tube.

This type of fitting relies upon the springback of the tube in obtaining a strong connection between the fitting and the tube. This limits the utility of the fitting because some tubular members are made of low-yield strength materials, such as copper, copper-nickel, some aluminums, some titaniums, and the like, and do not exhibit appreciable springback upon compression. Tubular conduits of this type are used extensively in the hydraulic systems of ships. These tubular members are of relatively great wall thickness which renders it impractical to attempt to transmit the contour of the exterior of the fitting to the interior to so deform the tubular element upon a swaging operation. Also, the creation of the ridges on the inner surface of the fitting, and hence on the inner surface of the tubular member in the fitting, would result in constrictions which may produce undesirable pressure drops. Also, such ridges on the interior of the fittings create noise as the hydraulic fluid is conducted through the system which may not be acceptable in the construction of submarines where silent operation is essential.

SUMMARY OF THE INVENTION

The present invention provides a fluid fitting which is connected to conduits by swaging, yet avoids the difficulties noted above. It can be used with thick-walled, low-yield strength conduits, not relying upon the springback of the conduit material. Also, it creates little distortion in the internal wall of the conduits so that pressure drop and noise difficulties are eliminated.

The fitting is a metal sleeve which is adapted to receive the end portion of a tubular member in each of its ends so that the inner ends of the tubular members are in adjacency at the center of the fitting. The outer end portions of the fittings provide retention areas which grip the tubular members upon swaging to hold them within the fitting. Inwardly of each of the retention areas is the sealing area where a fluid-tight seal is obtained to prevent loss of fluid from the system.

At each of the retention areas there is a ridge means, which may be defined by a single helical ridge, which is caused to penetrate the exterior surface of the conduit upon swaging. Axial grooves may separate the ridge into teeth which individually penetrate the conduit, resisting torsional loads. A counterbore at the outer end of each of the retention areas is lined with a cushioning material that lightly engages the periphery of the pipe after swaging. This prevents entry of materials into the retention area to protect this zone of joint against corrosion. Also the cushioning improves the life of the joint upon flexing of the conduits.

At the sealing area there may be one or more annular grooves with sealing elements in them, with an exterior annular ridge directly opposite the groove. Upon swaging, the groove concentrates the swaging force at the seal to compress the seal around the pipe to assure fluid-tight connection. There is also an annular ridge at the inner portion of the fitting which prevents the swaging of the seal area from causing collapse of the fitting around the end portions of the conduits in the fitting. This also improves the burst strength of the fitting.

There is a relief groove between the retention area and its adjacent sealing area, which separates the swaging operations of these two portions of the fitting. The relief groove also tends to provide a redundant metal-to-metal seal, as its corner digs into the surface of the pipe. It further provides a runout for the tool used in creating the ridge means at the retention area.

BRIEF DESCRIPTION OF THE DRAWINGS

FIG. 2 is a longitudinal sectional view of the fitting;

FIG. 5 is an enlarged fragmentary, longitudinal sectional view showing the fitting after swaging onto a tube;

DESCRIPTION OF THE PREFERRED EMBODIMENT

Figure 1:
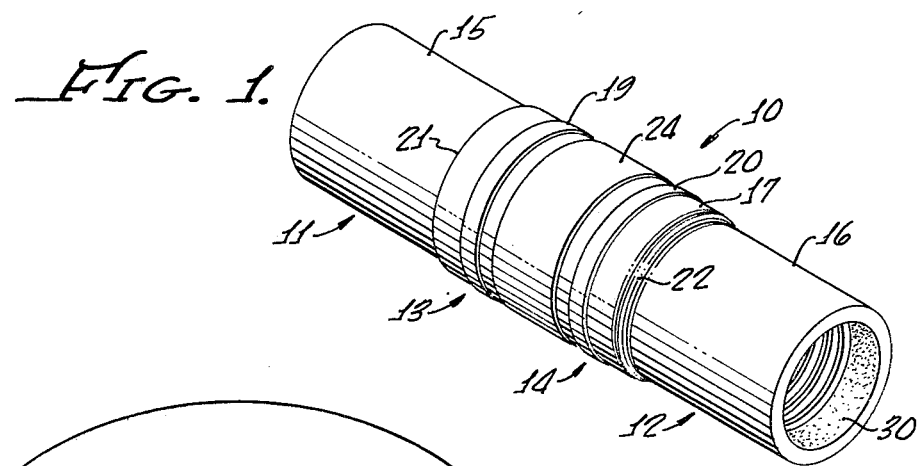
FIG. 1 is a perspective view of the fitting of this invention.

The fluid fitting 10 of this invention, as shown in FIG. 1, is a metal sleeve which is adapted to couple pipes or tubes, typically in a hydraulic system. The tubes are connected to the fitting by swaging, using radial movement of the swaging dies, which both retains the tubes within the fitting and provides a fluid-tight seal.

The end portions 11 and 12 of the fitting 10 act as the retention areas of the fitting, which mechanically interconnect the fitting to the tubes received within the fitting after the swaging operation. There are in addition sealing areas 13 and 14 inwardly of the retention areas 11 and 12, which prevent leakage of the fluid transmitted through the fitting from one tube to the other.

In exterior configuration the two retention areas 11 and 12 are of constant cylindrical shape, as defined by surfaces 15 and 16. Inwardly of the surfaces 15 and 16, the fitting has a larger external diameter as defined by the cylindrical surface 17. Annular ridges 19 and 20, which have cylindrical surfaces of still greater diameter, are spaced inwardly from the shoulders 21 and 22 at the ends of the surface 17. The ridges 19 and 20 are positioned at the sealing areas 13 and 14. An additional cylindrical annular ridge 24 has a diameter comparable to that of the ridges 19 and 20 and is positioned between and spaced from the ridges 19 and 20.

The interior surface 26 of the fitting is cylindrical in shape with counterbored ends 27 and 28 which form the entrances to the fitting. Relatively thin layers 29 and 30 of Teflon or of an elastomer such as silicone rubber line the entrances 27 and 28 of the fitting.

Figure 3:
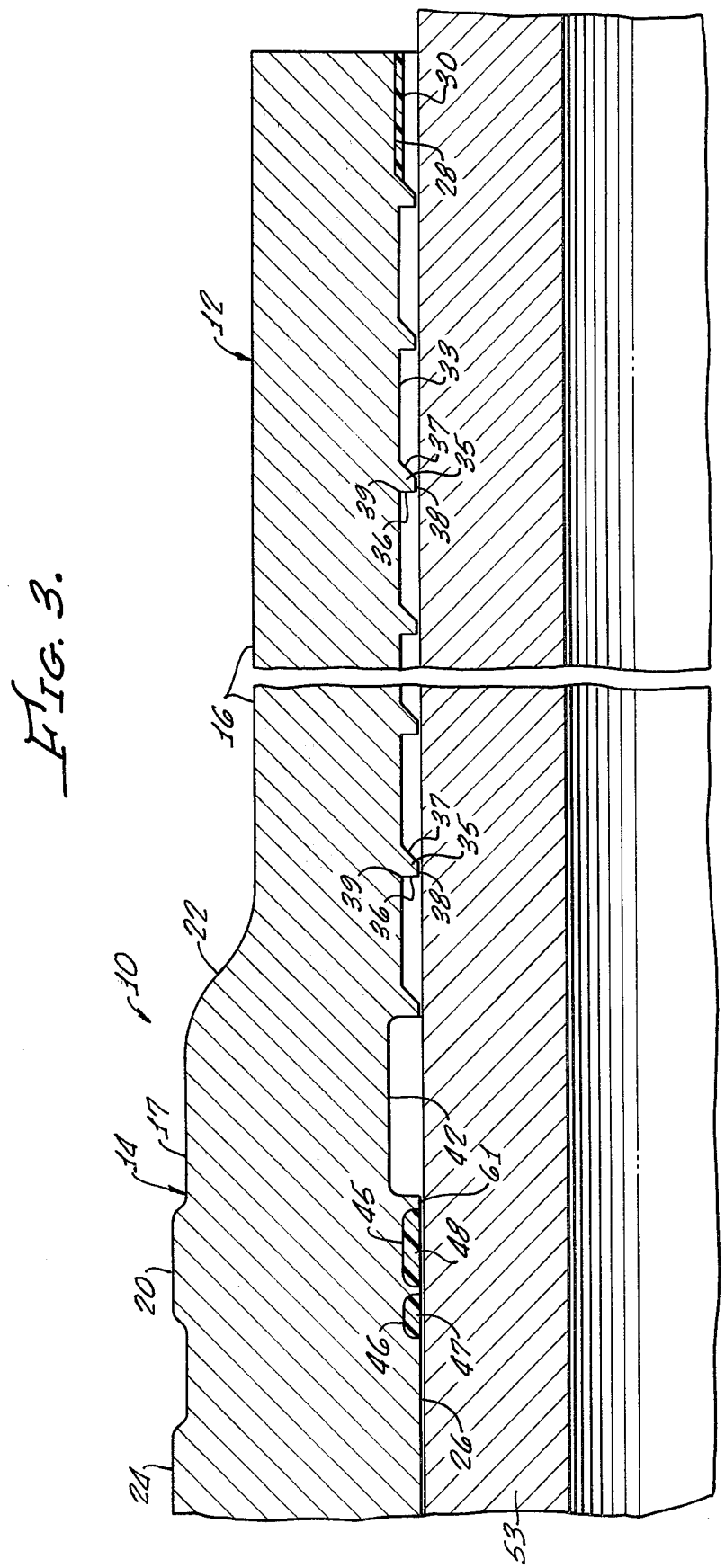
FIG. 3 is an enlarged fragmentary longitudinal sectional view showing the details of the retention and sealing areas of the fitting prior to swaging.

In the retention areas 11 and 12, grooves 32 and 33 are cut so as to produce helical ridges 34 and 35 throughout the lengths of these sections of the fittings. Alternatively, a series of annular ridges of similar cross section may be formed, although helical ridges are preferred because of ease of manufacture. The ridges 34 and 35 are mirror images of each other, each having a radial wall facing toward the center of the fitting and an inclined wall facing toward the outer end of the fitting. For the ridge 35, shown in enlarged section in FIG. 3, these surfaces are the radial wall 36 and the inclined wall 37. The angle of the inclined walls can range from 30° to 60° relative to the longitudinal axis of the fitting, preferably being 45°. The ridges have flat crests and flat roots, these being the crest 38 and the root 39 for the ridge 35. The pitch of the ridge is the same at both ends of the fitting and is a function of the diameter of the conduit which is to be retained by the fitting. Preferably this pitch is 1.5 to 1.8 times the conduit diameter, with 1.65 normally being the factor. The width of the crest of the ridge (i.e., its dimension axially of the fitting) depends upon its pitch and may be within the range of 1/12th to ⅛th of the pitch, preferably 0.09 times the pitch of the ridges. The depth of the ridges, that is the distance between the crest 38 and the root 39, is found by the formula $D=(L_t/2)+C$, where $L_t$ is the width of the crest 38 and C is a constant within the range of 0.010 to 0.025, preferably 0.012.

Between the retention areas 11 and 12 and the sealing areas 13 and 14 are relatively wide and deep cylindrical relief grooves 41 and 42. These grooves, which have cylindrical inner surfaces, are positioned inwardly of the end shoulders 21 and 22 of the external surface 17 where the fitting has less wall thickness than at the sealing area and greater wall thickness than at the retention area. One function of the grooves 41 and 42 is to provide a runout for the tool forming the ridges 34 and 35.

Inwardly of the groove 41 at the sealing area 12, and radially aligned with the external ridge 19, are sealing grooves 43 and 44, which are generally similar in shape to the relief groove 41, but more narrow and shallow than the relief groove. The inner groove 43 is not as wide as the outer groove 44. Similarly, for the sealing area 14, there are grooves 45 and 46 which correspond in configuration to the grooves 43 and 44 respectively. The grooves 45 and 46 are beneath the exterior ridge 20. Seals 47 and 48 of elastomeric material such as silicone rubber fill the grooves 45 and 46 and similar seals occupy the grooves 43 and 44. Alternatively O-rings or metallic seals may be employed. In some fittings, only a single groove and seal will be provided at each sealing area.

Figure 4:
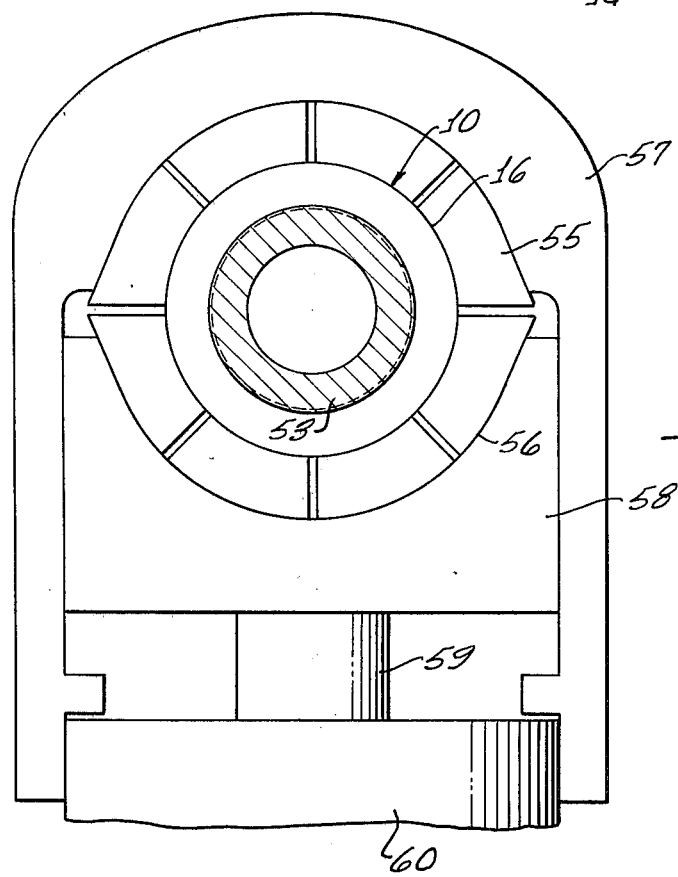
FIG. 4 is an elevational view, partially in section, illustrating the swaging of the fitting by a radial swaging tool.

In joining the tubes 52 and 53, which in the example illustrated are relatively thick-walled and are of a low-yield strength material, the ends of the tubes first are inserted into the opposite ends of the fitting and positioned adjacent to each other at the central portions of the fitting. Next, the fitting is swaged and for this it is preferred to use a radial swaging tool such as that disclosed in U.S. Pat. No. 3,848,451, issued Nov. 19, 1974, Frederick R. Allin, for SWAGING TOOL. This tool, as shown in FIG. 4, includes opposed segmented die halves 55 and 56, which extend around the fitting when the swaging operation is to take place. The outer die half 55 is supported by a removable restraining head 57 which remains fixed as the tool is actuated. The lower die half 56 is carried by a die block 58 which is at the outer end of a piston rod 59 that extends into a power cylinder 60. Consequently, upon actuation of the tool, the rod 59 is moved outwardly by the power of cylinder 60, thereby pressing the die block 58 toward the restraining head 57. This in turn causes the sets of segmented die halves 55 and 56 to be compressed around the fitting.

Figure 6:
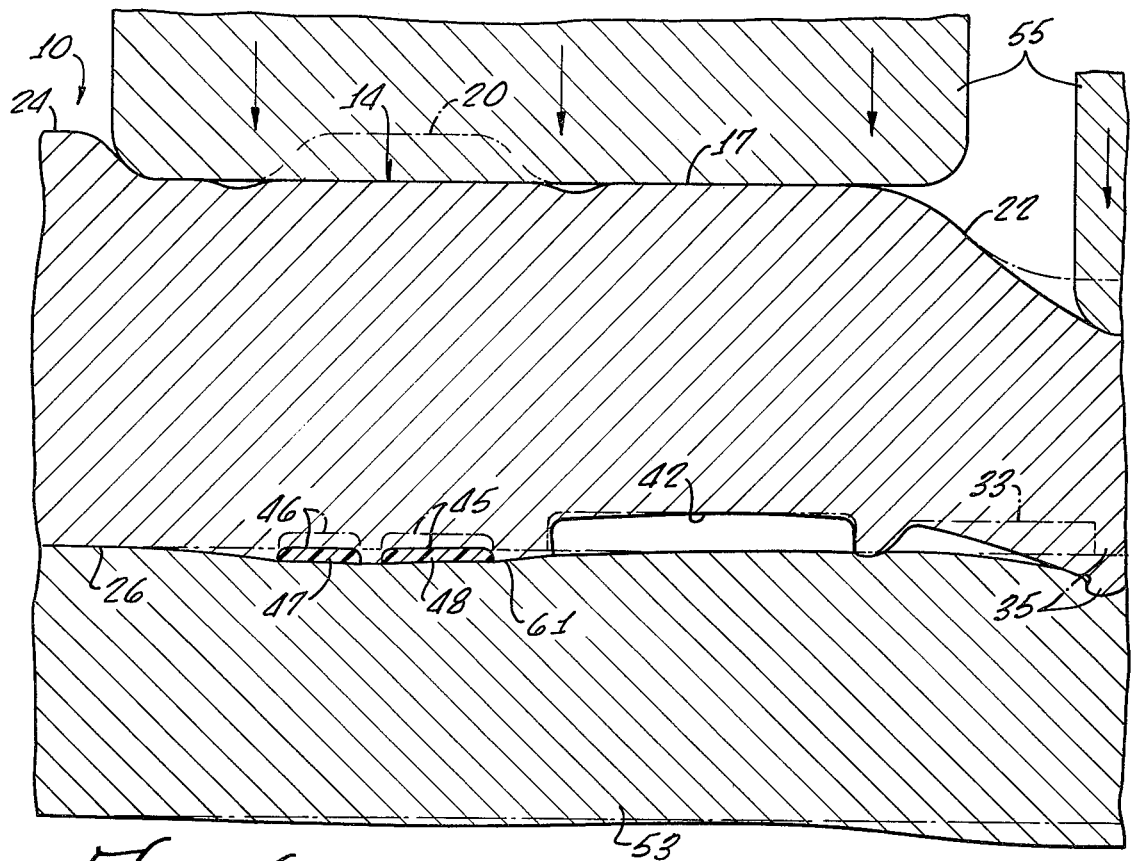
FIG. 6 is a further enlarged fragmentary longitudinal sectional view illustrating the sealing area following swaging.
Figure 7:
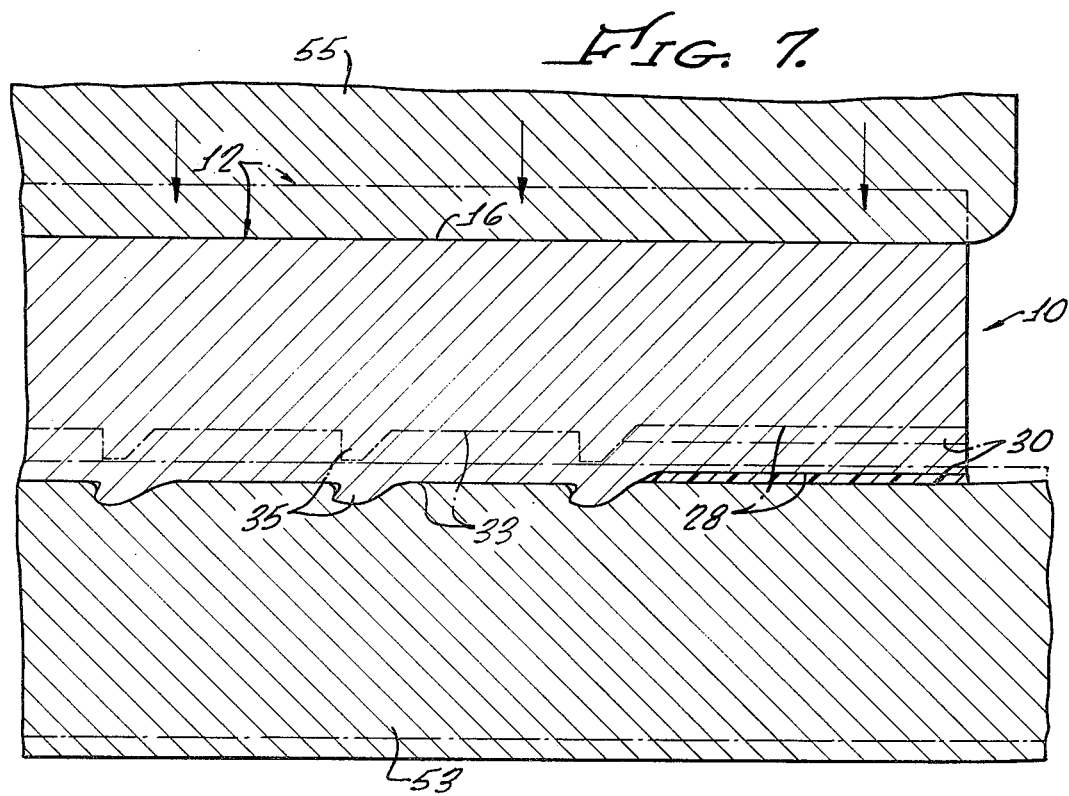
FIG. 7 is a fragmentary longitudinal sectional view showing the retention area following swaging.

It is preferred to swage the sealing areas 13 and 14 separately from the swaging of the retention areas 11 and 12. Consequently, the swaging tool first will be positioned around one of the sealing areas, for example, circumscribing the annular ridge 20 of the sealing area 14. Upon compression by the swaging tool, the exterior ridge 20 becomes flattened so that the outer surface at that area assumes approximately the same diameter as that of the surface 17 (see FIG. 6). This in turn causes the seals 47 and 48 to be pressed tightly against the periphery of the tube 53 that is within the end of the fitting. The existence of the annular ridge concentrates the swaging force at the zone of the seals 47 and 48. The seals 47 and 48 being of resilient material, become compressed and are in fluid-tight engagement with the surface of the tube 53 after the swaging. During this swaging operation, the center ridge 24 of the fitting, by strengthening the center area of the fitting, prevents the center portion of the fitting from collapsing around the tube as the sealing area 14 is compressed. Constriction of the center portion of the fitting would exert an axial force tending to push the tube 53 out of the fitting and is undesirable. The center ridge 24, with the resulting increased wall thickness at the center of the fitting, also imparts a high resistance to bursting forces to the fitting.

The relief groove 42 helps limit the swaging action to the area of the seals 47 and 48, separating the sealing area 14 from the retention area 12. In other words, the retention area is unaffected by the swaging of the sealing area as the wall of the fitting experiences some deflection at the zone of the relief groove. The annular land 61, between the relief groove 42 and the sealing groove 44, digs into the outer surface of the tube 53 in response to the swaging of the sealing area 14. This provides a metal-to-metal seal at this location which assists the elastomeric seals 47 and 48 in retaining the fluid during use of the hydraulic system.

After swaging the sealing areas 13 and 14, the retention areas 11 and 12 of the fitting are swaged. Each retention area is swaged in one operation in smaller sized fittings, while for larger fittings it may be necessary to position the swaging tool at two or three locations on each retention area for separate operations. Upon the compression of the fitting at the retention areas, the ridges 34 and 35 are pressed into the outer surfaces of the tubes 52 and 53. The retention areas 11 and 12 have less wall thickness than the sealing areas 13 and 14 and are compressed inwardly a greater distance when swaged. A mechanical lock is provided because the ridges 34 and 35 penetrate the surfaces of the tubes and the material of the tubes is forced into the grooves 32 and 33 that separate the ridges 34 and 35. The convergence of the ridges 34 and 35 toward their crests helps them to penetrate the outer surfaces of the tubes upon swaging. The radial inwardly facing ridge walls (e.g., the wall 36) provide abutment surfaces that effectively resist forces tending to pull the tubes out of the fitting. The inclined outwardly facing walls (e.g., the wall 37) result in increased cross sections for the ridges at their bases, giving them good shear strength.

When the retention area is swaged in two or more operations, better results are obtained if there is a narrow gap left unswaged between the zones separately swaged. This occurs because there is a shorter portion of the tube deflected as a beam by each swaging operation, such deflection tending to lessen the penetration of the ridge into the tube.

The relief grooves 41 and 42 again separate the sealing and retention areas as the retention areas are swaged. The wall of the fitting will bend at the relief grooves when the retention areas are swaged, leaving the sealing areas undisturbed.

Even though a strong attachment is made, there is little distortion of the inner surface of the tube. In other words, most of the change in the contour of the tube occurs along its outer surface and not its inner surface where the fluid is engaged. This, in turn, minimizes pressure drop and hydraulic noise as the fluid is transmitted through the system.

The outer ends of the fitting are compressed by the swaging so that the Teflon or rubber coatings 29 and 30 at the entrances to the fitting engage the surfaces of the tubes 52 and 53. This is a light interference condition which does not adversely affect the corrosion resistance of the tubes. The result is an external seal which protects against entry of fluids or other materials into the retention areas, thereby protecting the tubes and fitting against corrosion exteriorly. This also provides a resilient cushion which greatly improves the life of the tubes and fitting upon flexing of the tubes.

Figure 8:
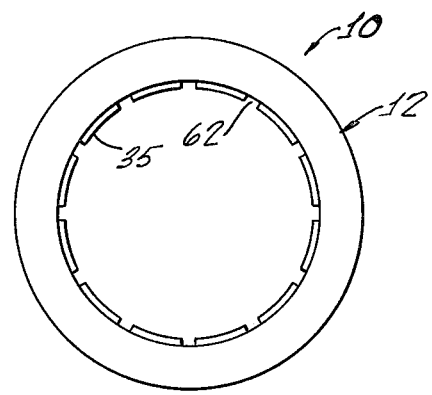
FIG. 8 is an end elevational view of the fitting provided with longitudinal internal slots for resisting rotational loads.

When substantial torsional loads may be applied to the tubes, it is preferred to make additional axial cuts through the retention areas to separate the ridges into separate teeth. This is shown in FIG. 8 where axially extending grooves 62 are cut through the ridge 35 through the length of the retention area 12. As a result, the material of the tube will enter the grooves 62 upon the swaging operation which will prevent the tube 53 from unscrewing through the helical ridge 35 under torque loads. The relief groove 42 provides a runout for the broaching tool that forms the grooves 62.

The fitting may be constructed with only one end intended for swaging and the other made compatible with some other kind of fitting or device.

Figure 9:
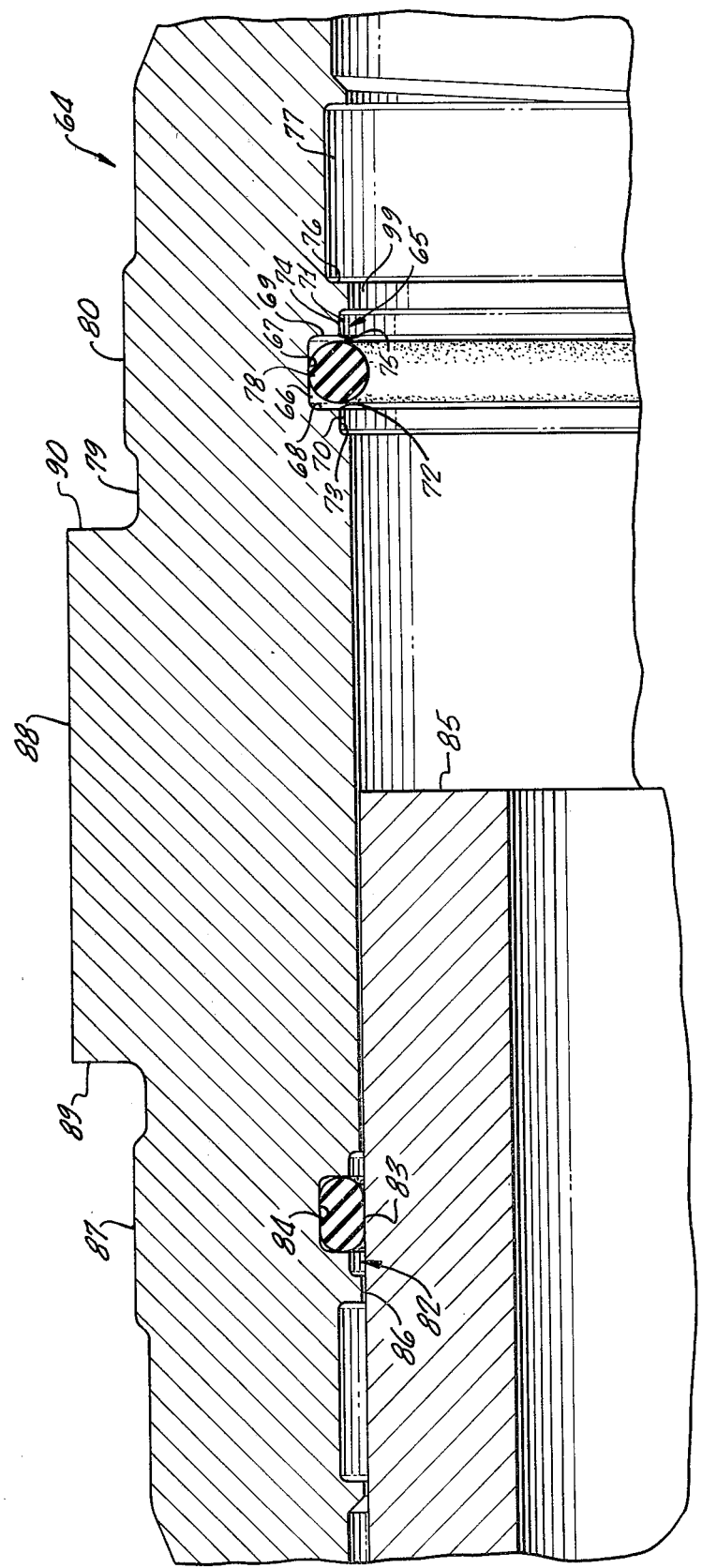
FIG. 9 is a fragmentary enlarged longitudinal sectional view of the center portion of a modified form of the invention.
Figure 10:
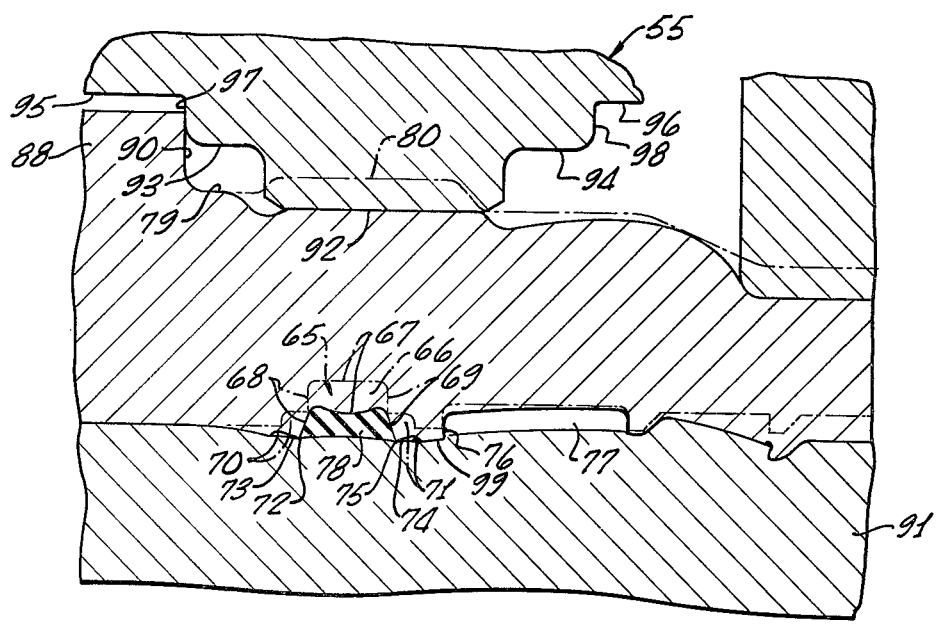
FIG. 10 is a fragmentary sectional view of the fitting of FIG. 9 after swaging.
Figure 11:
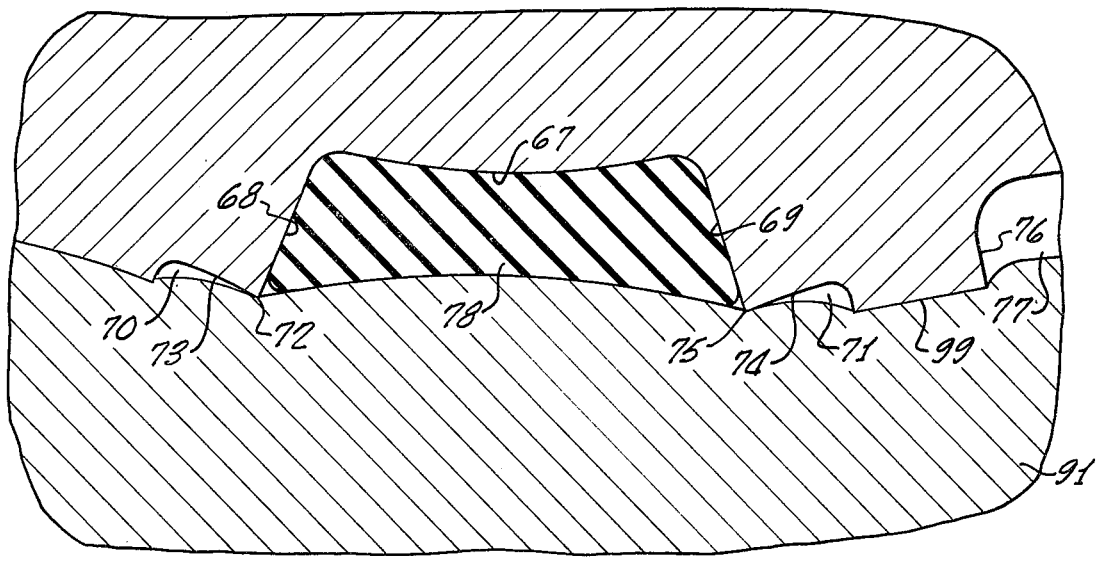
FIG. 11 is a further enlarged sectional view of the sealing area of the fitting of FIG. 9 after swaging.

The effectiveness of the seal is enhanced in the embodiment of FIGS. 9, 10 and 11 which includes a single but deeper groove at each of the sealing areas. Because of the depth of the groove, this embodiment normally finds it primary use in larger sizes of fittings where the wall thickness is greater.

As best seen in FIG. 9, at the right-hand portion of the fitting 64 is a single internal sealing groove 65, which is of stepped configuration. That is to say, the groove 65 includes a relatively deep portion 66 defined by an inner circumferential wall 67 which connects to opposed radial side walls 68 and 69. Shallower side portions 70 and 71, positioned one on either side of the central portion 66, complete the groove 65. A relatively sharp corner 72, with an included angle of 90°, is formed where the rearward radial side wall 68 of the central groove portion 66 meets the inner circumferential wall 73 of the rearward shallower groove portion 70. Similarly, the inner circumferential wall 74 of the forward relatively shallow groove portion 71 meets the forward radial side wall 69 of central groove portion 66 to form a sharp 90° corner 75.

Outwardly in the axial direction from the forward shallow groove portion 71 is a land 76 separating the groove 65 from the relief groove 77, which is similar to the relief groove 42 in the previously described embodiments. An elastomers O-ring 78 is positioned within the central groove portion 66.

On the exterior of the fitting 64, the cylindrical surface 79 that extends from over the relief groove 77 to the central portion of the fitting is interrupted by a ridge 80 positioned radially outwardly of both the sealing groove 65 and the land 76. In the example shown, the rearward edge of the cylindrical portion of the ridge 80 is aligned with the terminus of the rearward shallow sealing groove portion 70. The forward end of the ridge 80 extends just beyond the land 76.

The fitting 64 illustrated is for connecting two pipes or tubes and so has the same configuration at both ends. Accordingly, in the left-hand portion of the fitting, as shown in FIG. 9, there is a sealing groove 82 which is identical to the sealing groove 65 and receives an elastomeric O-ring seal 83 in its central portion 84. In the position of FIG. 9, a pipe 85 has been inserted into the left-hand end of the fitting 64, pressing the O-ring 83 outwardly into the central portion 84 of the groove 82. In this condition the O-ring 83 does not occupy the entire volume of the central groove portion 84.

Radially outwardly of the groove 82 and the land 86, which is beyond the groove 82, is a circumferential ridge 87 for concentrating a swaging force at the sealing area.

The ridge 88 at the central portion of the fitting is of greater outside diameter than the central ridge 24 of the previously described embodiment. At the lefthand and right-hand ends, respectively, of the ridge 88 are radial walls 89 and 90. The larger ridge 88 provides greater wall thickness and therefore increased strength at the central portion of the fitting, while the walls 89 and 90 provide stop surfaces for positioning the swaging tool as described below.

The swaging of the right-hand portion of the fitting 64 is illustrated in FIGS. 10 and 11. After the insertion of the pipe 91 into the right-hand end of the fitting 64, the swaging tool 54 is positioned around the fitting with the die halves 55 and 56 circumscribing the ridge 80. The die half 55 appears in FIG. 10, and the other die half 56 has the same configuration. The central portion 92 of the die half 55 is of a width comparable to that of the ridge 80 and is the portion of the die that exerts the inward swaging force when the die is actuated. A relief is provided on either side of the central portion to the surfaces 93 and 94. The two dies, therefore, define a larger diameter at the surfaces adjacent the central portion 92. Outwardly of the die surfaces 93 and 94 is a further relief to die surfaces 95 and 96. The latter surfaces are connected to the surfaces 93 and 94 by radial walls 97 and 98.

When the swaging tool is moved leftward over the fitting 64, as the components are illustrated in FIG. 10, the left radial die surface 97 is brought into engagement with the right-hand end surface 90 of the ridge 88, which limits the axial travel of the die. The parts are proportioned so that the central die portion 92 then is directly over the ridge 80 of the sealing area. The die surface 98 acts as the positioning stop to engage the ridge end 89 when the sealing area of the left end of the fitting is to be swaged. It is important that the swaging force be properly applied through the ridge 80 to the sealing area and the positioning of the swaging tool through the means of the central ridge facilitates obtaining of the proper location of the tool to accomplish this.

After the tool has been positioned around the ridge 80, the die halves 55 and 56 are advanced toward each other to accomplish the swaging operation. This forces the material of the fitting inwardly to the solid line position of FIGS. 10 and 11. When the swaging begins, the inner circumferential surface 99 of the land 76 is forced against the outer surface of the pipe 91 and begins a ring cut. As swaging continues, the circumferential walls of the groove 65 are pressed inwardly toward the pipe 91. This causes the sealing groove 65 to become distorted so that the central portion 66 becomes generally trapezoidal in shape. Thus, the bases of the side walls 68 and 69 are forced away from each other so that these walls become convergent in the radially outward direction. As this movement of the side walls 68 and 69 of the central groove portion takes place, the cylindrical surfaces 73 and 74 of the inner and outer shallow groove portions 70 and 71 are forced downwardly adjacent the central groove portion 66. This causes the corners 72 and 75 to bear against the outer surface of the pipe 91. As a result, these corners cut into the surface of the pipe completely around its periphery.

When the swaging operation at the sealing area is complete, the ridge 80 is depressed below the level of the outer cylindrical surface 79. The relief at the die surface 93 assures that there is no engagement of the fitting surface 79 between the ridges 80 and 88. Similarly, the die surface 95 clears the outer surface of the central ridge 88 so that there is no swaging of the central ridge.

As the sealing groove area is distorted as shown in FIGS. 10 and 11, the O-ring 78 is forced tightly against the outer surface of the pipe 91 to form an effective seal. The O-ring 78 is selected so as to have a cross-sectional area which equals the cross-sectional area of the central groove portion 66 when the swaging operation is complete. This assures that the O-ring 78 will tightly bear against the surface of the pipe, yet at the same time it will not be forced outwardly of the central groove portion 66. This, in turn allows the corners 72 and 75 to dig into the surface of the pipe 92 without interference from the O-ring.

In addition to the seal accomplished by the O-ring 78, metal-to-metal seals are achieved through the engagement of the fitting and the pipe. One seal occurs at the land 76 where its inner cylindrical surface 99 cuts into the outer periphery of the pipe 91. A second metal-to-metal seal is formed where the counter 75 between the central sealing groove side wall 69 and the forward shallow sealing groove wall 74 is caused to dig into the surface of the pipe around its periphery. In a similar manner, the corner 72 at the rearward end of the central sealing groove 66 cuts into the outer surface of the pipe 91 to form a third metal-to-metal seal.

When the fitting yield strength is less than that of the pipe received in the fitting, the metal-to-metal seals are adequate for hydraulic systems, at least in some applications, and the elastomeric seal may be eliminated. If the yield strength of the pipe is equal to or less than that of the fitting, the elastomeric seal may be required because of the springback of the fitting after swaging. It is preferred to use the elastomeric seal in all instances where gases are transmitted in the system.

The foregoing detailed description is to be clearly understood as given by way of illustration and example only, the spirit and scope of this invention being limited solely by the appended claims.

I claim:

1. A fluid fitting comprising
   a sleeve having
   a first portion at one end thereof,
   and a second portion inwardly to said end thereof,
   said first portion having ridge means on the inner periphery thereof adapted to penetrate the periphery of a tubular member inserted therein for forming a retention thereto,
   the inner periphery of said second portion including an annular land, and an annular groove adjacent said land,
   said groove including a relatively deep central portion and a relatively shallow portion on either side of said relatively deep portion so that the wall of said groove forms intersecting corners between said relatively deep portion and said relatively shallow portions, whereby upon application of an external inward radial force said land and said wall of said groove at said corners is forced against the periphery of a tubular member received in said sleeve for forming a seal therewith.

2. A device as recited in claim 1 including in addition a sealing member only in said relatively deep portion of said groove.

3. A device as recited in claim 1 in which said sealing member is an elastomeric O-ring.

4. A device as recited in claim 3 in which said sealing member occupies a volume less than that of said relatively deep portion prior to the application of said external force, and a volume substantially equal to that of said relatively deep portion following application of said external force.

5. A device as recited in claim 1 in which said sleeve has an annular ridge around the exterior of said second portion of engagement by a tool for exerting such a radial force, said ridge being radially outwardly of said land and said groove for concentrating said force at said land and said groove.

6. A device as recited in claim 5 in which said land is positioned axially outwardly of said groove.

7. A device as recited in claim 6 in which said sleeve includes a third portion axially inwardly of said second portion, said third portion having a greater wall thickness than said second portion, and an outside lateral dimension greater than that of said annular ridge.

8. A fluid fitting for interconnecting two tubular members comprising a metal sleeve having opposite ends and a central portion intermediate said ends, said sleeve including a duality of spaced attaching portions for attachment to tubes received in said sleeve, one of said attaching portions being adjacent one of said ends and the other of said portions being adjacent the other of said ends, each of said attaching portions including internal ridge means for penetration into the exterior of a tube received in said sleeve upon inward swaging of said attaching portion, and having a first cylindrical exterior surface of a first diameter, said sleeve having a second cylindrical exterior surface of a greater diameter than that of said first diameter intermediate said attaching portions, and including a duality of spaced sealing portions for sealing against the exteriors of tubes so received in said sleeve, one of said sealing portions being adjacent and inwardly of one of said attaching portions and the other of said sealing portions being adjacent and inwardly of the other of said attaching portions, said sleeve including at least one internal annular groove at each of said sealing portions, each of said sealing portions including an annular external ridge radially outwardly of said groove and of greater diameter than said second exterior surface for concentrating an externally applied swaging force at said groove, an additional external annular ridge intermediate and spaced from said annular ridges of said sealing portions and of greater diameter than the diameter of said second exterior surface for providing an increased wall thickness at said central portion of said sleeve, and an additional internal annular groove intermediate each of said sealing portions and the adjacent one of said attaching portions for providing a separation between said sealing portions and said attaching portions.

9. A device as recited in claim 8 in which said additional annular grooves are wider than said internal grooves of said sealing portion.

10. A device as recited in claim 8 in which said sleeve includes a counterbore in each of said ends, and including a sealing material in each of said counterbores for sealing against the exteriors of tubes received in said sleeve.

11. A device as recited in claim 8 in which each of said ridge means includes a first wall facing toward said central portion of said sleeve, and a second wall facing toward the adjacent one of said opposite ends, said first wall being substantially vertical relative to the longitudinal axis of said sleeve, said second wall being inclined relative to said axis, thereby providing said ridge means with a relatively broad base and a narrower crest.

12. A device as recited in claim 8 in which the wall of said internal annular groove at each of said sealing portions defines a central relatively deep portion and a relatively shallow portion on either side of said central portion, said wall forming a corner at the intersection of each of said relatively shallow portions and said central portion, each of said additional internal annular grooves being adjacent said internal annular groove of one of said sealing portions so as to define a land therebetween, said annular external ridge of each of said sealing portions being radially outwardly of one of said lands.

13. A device as recited in claim 12 including a sealing member in said central portion only of each of said internal annular grooves of said sealing portions.

14. A fluid fitting comprising a metal sleeve having a first portion at one end thereof, and a second portion inwardly of said end thereof, said first portion having ridge means on the inner periphery thereof adapted to penetrate the periphery of a tubular member inserted therein for forming a retention thereto upon exertion of an external inwardly directed swaging force on said first portion, said second portion having sealing means therein, said sealing means including at least one annular groove in the inner wall of said second portion, said second portion having a greater outside diameter and a greater wall thickness than that of said first portion, and having an external ridge radially outwardly of said groove for engagement by a swaging tool for exerting an external inwardly directed swaging force for compressing said second portion at said groove and effecting a seal on a tubular member received therein, said sleeve including an additional annular groove intermediate said sealing means and said ridge means for permitting said sleeve to deflect at said additional groove when a swaging force is applied to said external ridge so that such a swaging force does not affect said first portion.

15. A device as recited in claim 14 including in addition a sealing member in said first mentioned groove.

16. A device as recited in claim 14 in which said inner wall at said first mentioned groove defines relatively sharp corner means for penetrating the outer surface of such a tubular member and effecting a metal-to-metal seal therewith upon said compression of said second portion.

17. A device as recited in claim 16 in which a land is defined between said first mentioned annular groove and said additional groove, said sharp corner means being on the edge of said land.

18. A device as recited in claim 17 in which said additional annular groove is wider than said first mentioned annular groove.

19. A device as recited in claim 14, in which said ridge means is provided with a wall facing inwardly of said one end of said fitting which is in a substantially radial plane, and a wall facing toward said end of said fitting which is inclined relative to the axis of said fitting.

20. A device as recited in claim 19 in which said inclined wall is within the range of 30° to 60° relative to the longitudinal axis of said fitting.

21. A device as recited in claim 14 in which said ridge means is defined by an internal annular ridge, said ridge being interrupted to provide a plurality of separate segments for penetrating the periphery of said tubular member.

22. A device as recited in claim 14 in which,
said first portion includes an enlarged entrance at said one end of said fitting,
said ridge means being inwardly of said entrance,
and including a sealing material around the surface of said entrance for engaging the surface of a tubular member attached to said fitting.

23. A device as recited in claim 14 in which said sleeve includes
a third portion inwardly of said second portion,
said third portion having a greater outside diameter and a greater wall thickness than said second portion.

24. A fluid fitting comprising
a sleeve having
a first portion at one end thereof,
and a second portion inwardly of said end thereof,
said first portion having ridge means on the inner periphery thereof adapted to penetrate the periphery of a tubular member inserted therein for forming a retention thereto,
the inner periphery of said second portion having a circumferential groove therein,
said groove having a relatively deep portion and two relatively shallow portions positioned one on either side of said relatively deep portion so that the wall of said groove defines a corner at the intersection of said relatively deep portion and each of said relatively shallow portions, whereby upon application of an external radial force said wall of said groove at each of said corners is forced against the periphery of a tubular member received in said sleeve for forming a seal therewith.

25. A device as recited in claim 24 in which said relatively deep portion includes a circumferential wall and two opposed substantially radial walls, and each said relatively shallow portion includes a substantially radial wall, and a circumferential wall connecting to one of said substantially radial walls of said relatively deep portion, thereby to define one of said corners.

26. A fluid fitting for connecting two tubular members comprising
a sleeve having opposite ends which are adapted to receive end portions of tubular members to be joined, said sleeve including
a retention portion adjacent each of said ends thereof,
each of said retention portions including ridge means on the inner surface thereof for penetration into a member received therein upon inward swaging of said retention portion, and having a substantially constant exterior diameter,
a duality of sealing portions, one of which is spaced inwardly from each of said retention portions,
each of said sealing portions including groove means on the inner surface thereof and having an exterior annular ridge radially outwardly of said groove means for engagement by a tool for inward swaging of said sealing portion at said exterior annular ridge, said exterior annular ridge being of greater exterior diameter than that of said retention portion,
and a central portion intermediate said sealing portions,
said central portion having an annular ridge on the outer surface thereof which is spaced from and positioned between said annular ridges of said sealing portions, for providing said central portion with an increased wall thickness,
said sleeve having an additional internal groove means intermediate each of said retention portions and the adjacent one of said sealing portions for isolating said sealing portions from said retention portions upon such inward swaging of said sealing portions and said retention portions,
said sleeve including a counterbore at either of said ends for providing an entrance to said ridge means,
and a sealing material along the circumferential wall of each of said counterbores.

* * * * *

UNITED STATES PATENT AND TRADEMARK OFFICE
CERTIFICATE OF CORRECTION

PATENT NO. : 4,328,982
DATED : May 11, 1982
INVENTOR(S) : Roger D. Christianson

It is certified that error appears in the above-identified patent and that said Letters Patent are hereby corrected as shown below:

Column 8, line 65, claim 5, "of" should read --for--.

Signed and Sealed this

Third Day of May 1983

[SEAL]

Attest:

GERALD J. MOSSINGHOFF

Attesting Officer     Commissioner of Patents and Trademarks